(12) United States Patent
Hu et al.

(10) Patent No.: US 10,571,645 B2
(45) Date of Patent: Feb. 25, 2020

(54) MULTIPLE-LENS CAMERA SYSTEM

(71) Applicant: TDK TAIWAN CORP., Yangmei Taoyuan (TW)

(72) Inventors: Chao-Chang Hu, Yangmei Taoyuan (TW); Bing-Ru Song, Yangmei Taoyuan (TW); Chih-Wei Weng, Yangmei Taoyuan (TW); Shu-Shan Chen, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 133 days.

(21) Appl. No.: 15/635,964

(22) Filed: Jun. 28, 2017

(65) Prior Publication Data

US 2018/0003918 A1     Jan. 4, 2018

Related U.S. Application Data

(60) Provisional application No. 62/357,557, filed on Jul. 1, 2016.

(30) Foreign Application Priority Data

Jun. 14, 2017   (CN) ...................... 2017 2 0690139 U

(51) Int. Cl.
    *G02B 7/02*    (2006.01)
(52) U.S. Cl.
    CPC .................................. *G02B 7/023* (2013.01)
(58) Field of Classification Search
    CPC . G02B 7/08; G02B 7/102; G02B 7/04; G02B 7/09; G02B 7/10; G02B 13/001;
    (Continued)

(56) References Cited

U.S. PATENT DOCUMENTS

| 2009/0097837 | A1* | 4/2009 | Chen ........................ G02B 7/08 396/133 |
| 2013/0044382 | A1* | 2/2013 | Phoon .................. H04N 5/2253 359/824 |
| 2018/0348538 | A1* | 12/2018 | Sugawara ................ G03B 5/00 |

FOREIGN PATENT DOCUMENTS

| WO | WO-2015124966 A1 * | 8/2015 | ............... G02B 7/08 |
| WO | WO-2017084090 A1 * | 5/2017 | ............... G03B 5/00 |

OTHER PUBLICATIONS

U.S. Appl. No. 15/499,428, filed Apr. 27, 2017.
U.S. Appl. No. 15/588,019, filed May 5, 2017.
U.S. Appl. No. 15/589,198, filed May 8, 2017.

* cited by examiner

*Primary Examiner* — Mahidere S Sahle
(74) *Attorney, Agent, or Firm* — Muncy, Geissler, Olds & Lowe, P.C.

(57) ABSTRACT

A multiple-lens camera system is provided, including a first lens driving module, a second lens driving module, and a shielding member. The first and second lens driving modules respectively include a frame, a lens holder movably disposed in the frame for holding a lens, a magnetic element disposed on a side of the lens holder and a driving board, wherein the driving board has a first coil corresponding to the magnetic element, to generate a magnetic force for moving the lens holder and the lens relative to the driving board. The shielding member is disposed in the first lens driving module and between the two magnetic elements of the first and second lens driving modules which are adjacent to each other, to suppress magnetic interference between the first and second lens driving modules.

19 Claims, 10 Drawing Sheets

(58) Field of Classification Search
CPC ........ G02B 23/2476; G03B 3/10; G03B 5/00;
G03B 13/34; G03B 13/36; G03B
2205/0069
USPC .................................. 359/694–706, 822–826
See application file for complete search history.

and China Patent Application No. 201720690139.2, filed on Jun. 14, 2017, the entirety of which are incorporated by reference herein.

MULTIPLE-LENS CAMERA SYSTEM

The present application claims priorities of U.S. Provisional Application No. 62/357,557, filed on Jul. 1, 2016, and China Patent Application No. 201720690139.2, filed on Jun. 14, 2017, the entirety of which are incorporated by reference herein.

BACKGROUND OF THE INVENTION

Field of the Invention

The invention relates to a multiple-lens camera system, and more particularly to a multiple-lens camera system that can move lenses using electromagnetic force.

Description of the Related Art

In existing dual-lens camera systems, two lens driving modules are usually arranged close to each other, and as a result, magnetic interference between the magnets of the two lens driving modules is likely to occur, causing the focus speed and accuracy of the lenses to be adversely affected. Therefore, what is needed is a dual-lens camera system that can prevent the magnetic interference between the two lens driving modules.

BRIEF SUMMARY OF THE INVENTION

In view of the aforementioned problems, an object of the invention is to provide a multiple-lens camera system that can reduce the magnetic interference generated by the magnetic elements of the lens driving modules, thereby improving the focus speed and accuracy of the lenses in the camera system.

An embodiment of the invention provides a multiple-lens camera system including a first lens driving module, a second lens driving module, and a shielding member. The first and second lens driving modules respectively include a frame, a lens holder movably disposed in the frame for holding a lens, a magnetic element disposed on a side of the lens holder and a driving board, wherein the driving board has a first coil corresponding to the magnetic element, to generate a magnetic force for moving the lens holder and the lens relative to the driving board. The shielding member is disposed in the first lens driving module and between the two magnetic elements of the first and second lens driving modules which are adjacent to each other, to suppress magnetic interference between the first and second lens driving modules.

In some embodiments, the magnetic element of the first lens driving module comprises a magnet protruding from a lower end of the shielding member.

In some embodiments, the shielding member is affixed to the frame by insert molding.

In some embodiments, the magnetic element of the first lens driving module comprises a magnet, and the shielding member protrudes from an upper end of the magnet.

In some embodiments, the multiple-lens camera system further includes a plurality of shielding members, respectively disposed in the first and second lens driving modules and between the magnetic elements of the first and second lens driving modules.

In some embodiments, the magnetic element of the first lens driving module comprises a magnet, and the height of the magnet along an optical axis of the lens is greater than the height of the shielding member along the optical axis.

In some embodiments, the magnetic element of the first lens driving module comprises a multipolar magnet having an upper portion and a lower portion, and the polar directions of the upper and lower portions are opposite to each other, wherein the ratio of the height of the upper portion along an optical axis of the lens to the height of the lower portion along the optical axis is ranged between 0.9 to 1.1.

In some embodiments, the multiple-lens camera system further includes a second coil disposed on the lens holder, wherein the magnetic element of the first lens driving module comprises a multipolar magnet having an upper portion and a lower portion, and the polar directions of the upper and lower portions are opposite to each other, wherein the upper portion is positioned corresponding to the second coil to move the lens holder relative to the frame along an optical axis of the lens, and the ratio of the height of the upper portion along the optical axis to the height of the lower portion along the optical axis is greater than 1.1.

In some embodiments, the magnetic element of the first lens driving module comprises a quadrapolar magnet.

In order to illustrate the purposes, features, and advantages of the invention, the preferred embodiments and drawings of the invention are shown in detail as follows.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The making and using of the embodiments of a multiple-lens camera system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
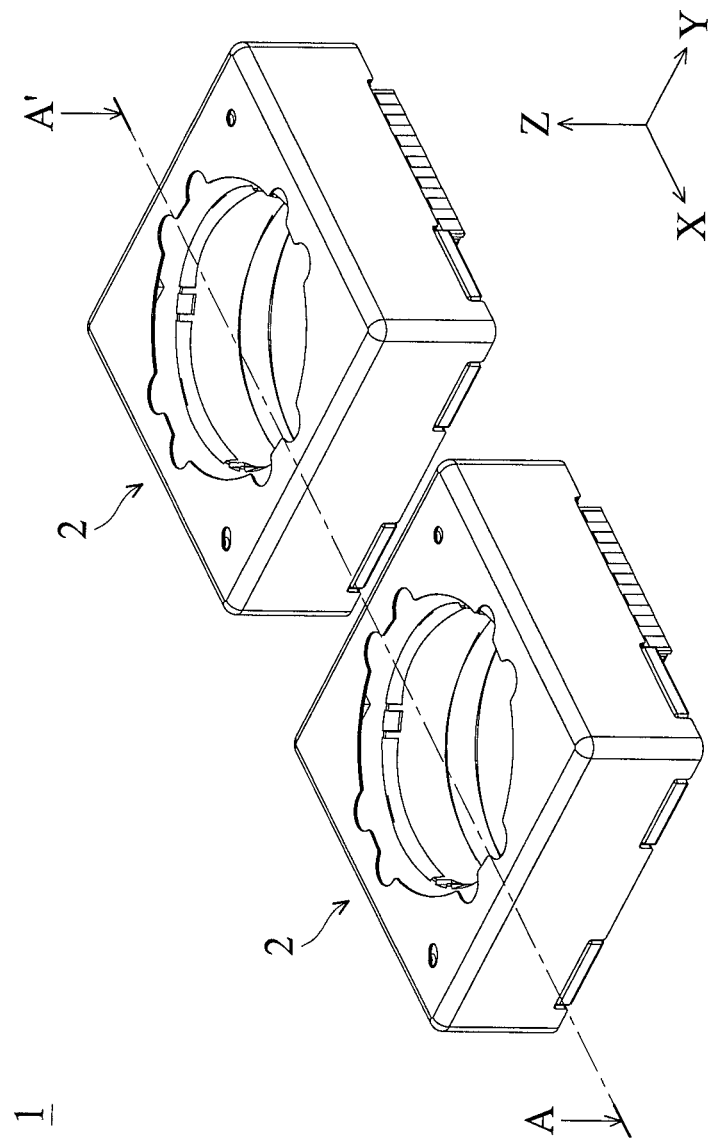
FIG. 1 is a schematic view of a multiple-lens camera system in accordance with an embodiment of the invention.
Figure 2:
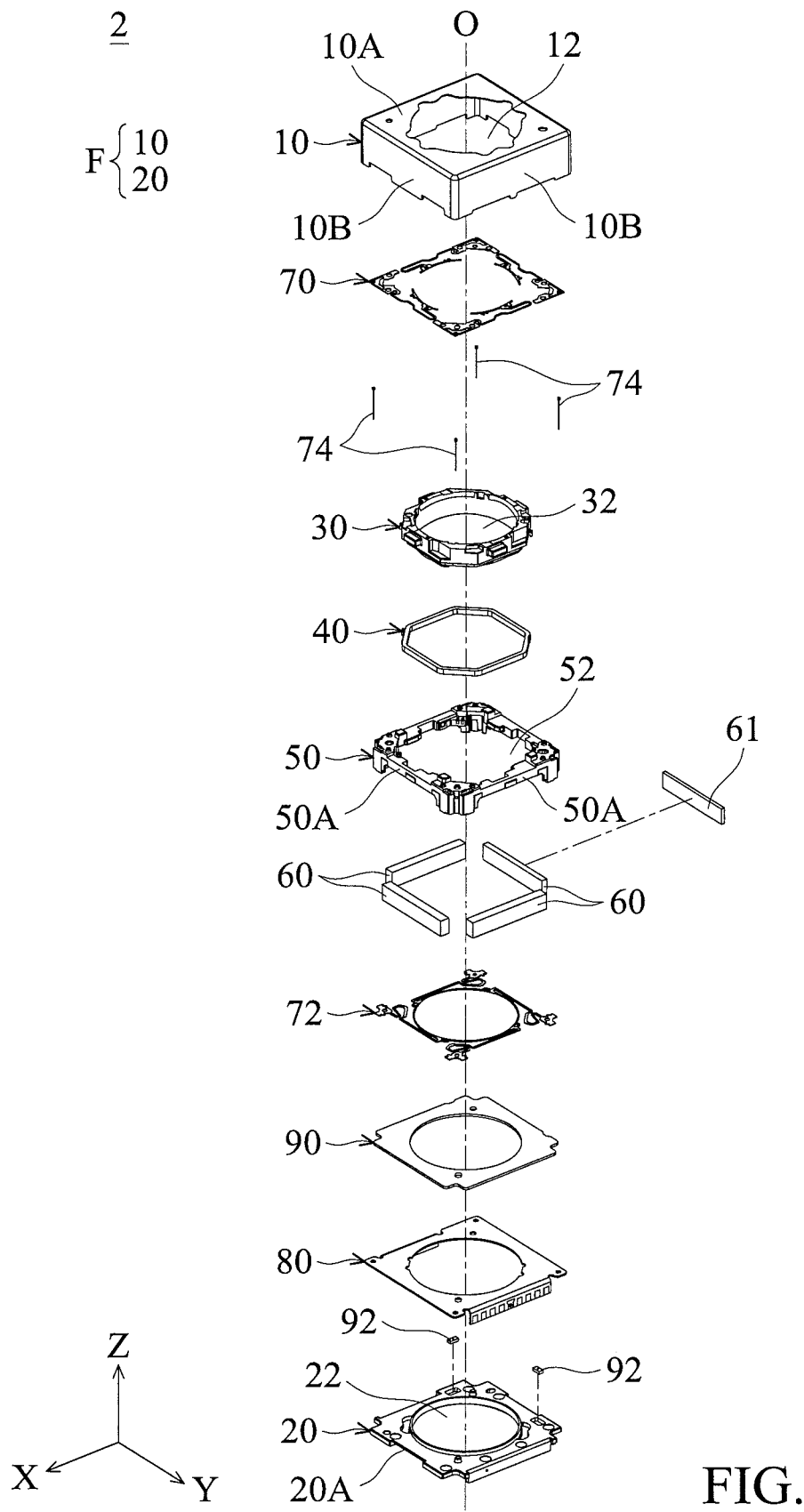
FIG. 2 is an exploded view of a lens driving module in FIG. 1.
Figure 3A:
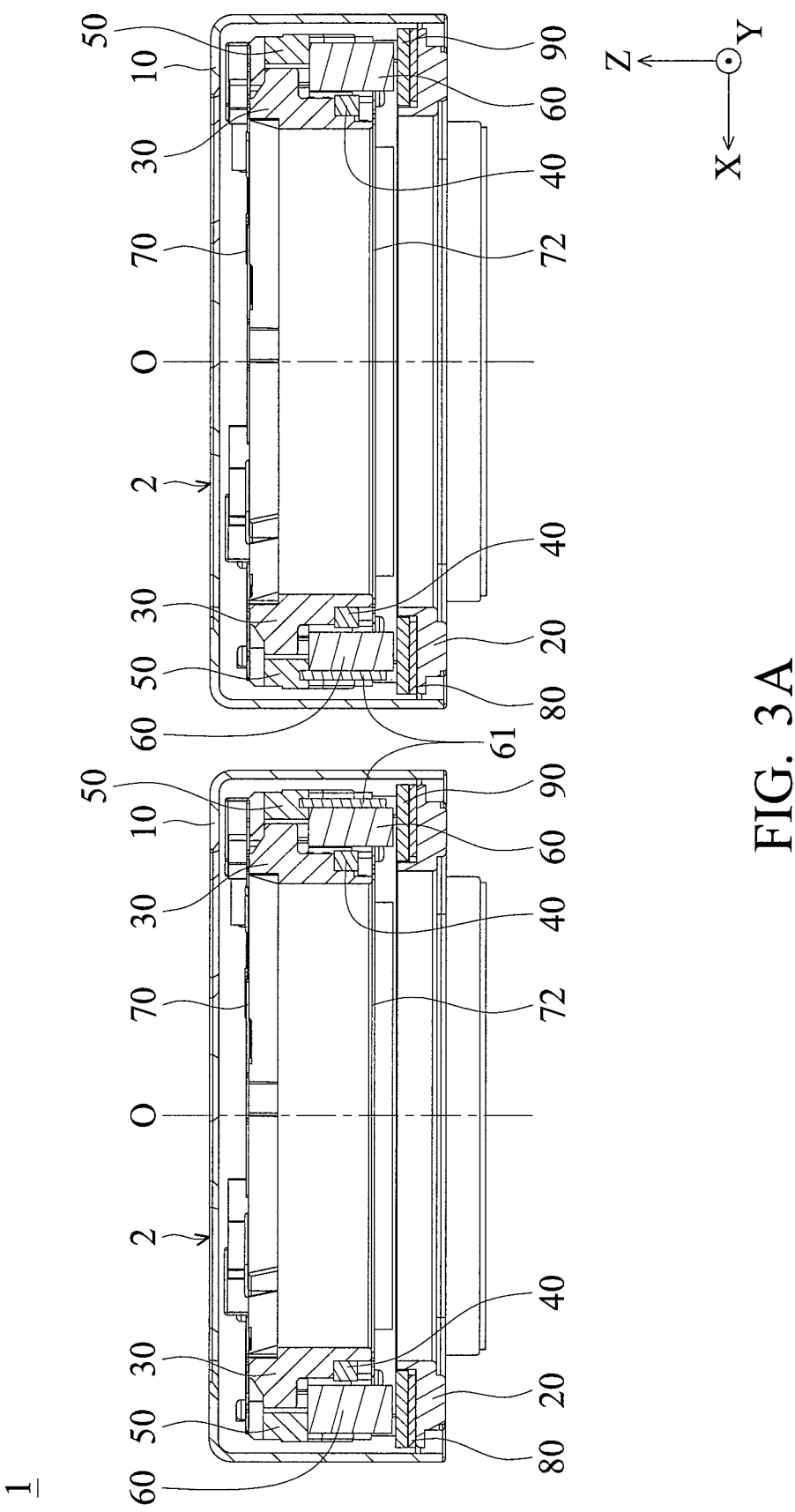
FIG. 3A is a cross-sectional view take along the line A-A' in FIG. 1.

Referring to FIGS. 1-3A, FIG. 1 is a perspective diagram of a multiple-lens camera system 1 according to an embodiment of the invention, FIG. 2 is an exploded diagram of a lens driving module 2 of the multiple-lens camera system 1 in FIG. 1, and FIG. 3A is a sectional view along line A-A' in FIG. 1. In this embodiment, two lens driving modules 2 of the multiple-lens camera system 1 are arranged along a longitudinal direction (the X axis) in a handheld electronic device, such as mobile phone or tablet computer. The two lens driving modules 2 may have the same specification and are capable of Optical Image Stabilization (OIS) and Auto focusing (AF), but the invention is not limited thereto. In some embodiments, the two lens driving modules 2 may have different sizes and specifications and are both capable of Optical Image Stabilization (OIS) and Auto focusing (AF).

As shown in FIG. 1-3A, each of the lens driving modules 2 comprises a top casing 10, a base 20, a lens holder 30, a coil 40, a frame 50, four magnets 60 (magnetic element), a shielding member 61, an upper spring sheet 70, a lower spring sheet 72, a plurality of flexible members 74, a circuit board 80, a driving board 90, and two magnetic sensors 92.

The top casing 10 has a hollow structure. Also, the top casing 10 can be combined with the base 20 to form a housing F of the lens driving module 2, wherein the top casing 10 constitutes a top wall 10A and four sidewalls 10B of the housing F, and the base 20 constitutes a bottom wall 20A of the housing F. In addition, a top casing opening 12 and a base opening 22 are respectively formed on the top casing 10 and the base 20. The center of the top casing opening 12 is located on an optical axis O (parallel to the Z axis) of a lens (not shown). The base opening 22 is also located on the optical axis O and faces an image sensor (not shown) placed outside the lens driving module 2. Accordingly, the lens in the lens driving module 2 and the image sensor can perform image focusing in the direction of the optical axis O.

The frame 50 has an opening 52 and four frame edges 50A respectively corresponding to the four sidewalls 10B of the housing F. In this embodiment, the four driving magnets 60 are affixed to the four frame edges 50A. In some embodiments, the four driving magnets 60 may also be affixed to four corners of the frame 50. The shape of the driving magnets 60 may be a long strip.

The lens holder 30 has a hollow structure and a through hole 32. The through hole 32 forms a threaded structure (not shown) corresponding to another threaded structure on the outer peripheral surface of the lens, such that the lens can be secured in the through hole 32. The driving coil 40 (second driving coil) is wound around the outer peripheral surface of the lens holder 30.

In this embodiment, the lens holder 30 and the lens therein are movably disposed in the frame 50. More specifically, the lens holder 30 is suspended in the center of the frame 50 by the upper spring 70 and the lower spring 72 made of a metal material. When a current is supplied to the driving coil 40, the driving coil 40 can act with the magnetic field of the driving magnets 60 to generate an electromagnetic force to move the lens holder 30 and the lens therein along the Z axis with respect to the frame 50. In some embodiments, the four driving magnets 60 (magnetic elements) may include at least one multipole magnet which is used to electromagnetically act with the driving coil 40 to move the lens holder 30 and the lens along the optical axis O, so as to perform image focusing.

The outer peripheral portions of the upper and lower springs 70 and 72 are respectively connected to the upper and lower sides of the frame 50, and the inner peripheral portions of the upper and lower springs 70 and 72 are respectively connected to the upper and lower sides of the lens holder 30, so that the lens holder 30 can be suspended in the frame 50.

The circuit board 80, such as a flexible printed circuit board (FPC), is affixed to the base 20 by adhesion, for example. In this embodiment, the circuit board 80 is electrically connected to a driving unit (not shown) placed outside the lens driving module 2 to perform OIS and other functions (such as AF function).

One end of the four suspension wires 74 is affixed to the circuit board 80 and the other end is connected to the upper spring 70, so that the suspension wires 74 can suspend the frame 50 and the lens holder 30 in the housing F. The suspension wires 74 may comprise a metal material.

The driving board 90, such as a printed circuit board, has four first driving coils (not shown) therein. The positions of the four first driving coils respectively correspond to the positions of the four driving magnets 60. The driving board 90 is affixed to the circuit board 80 by adhesion, for example.

It should be realized that the circuit board 80 is provided with wiring (not shown) for transmitting electrical signals to the driving coil 40 and the first driving coils of the driving board 90. In some embodiments, the wiring on the circuit board 80 may be electrically connected to the driving coil 40 through the suspension wires 74 and the upper spring 70, thereby controlling the movement of the lens holder 30 along the optical axis O.

In this embodiment, two magnetic field sensing elements 92 are respectively mounted on two sides of the base 20 extending in the X and Y directions. The two magnetic field sensing elements 92 may be Hall effect sensors, MR sensors, or Fluxgate sensors, and can be used to learn the position offset amount of the frame 50 and the lens holder 30 with respect to the base 20 in the X and Y directions by detecting the magnetic field variation of the magnetic elements 60 on the frame 50.

Furthermore, the circuit board 80 can generate electrical signals to be transmitted to the first driving coils of the driving board 90, and the first driving coils can act with the driving magnets 60 on the frame 50 to generate an electromagnetic force to move the frame 50 and the lens holder 30 therein along a direction that is perpendicular to the optical axis O (parallel to the XY plane) to compensate for the position offset described above. As a result, the OIS function is achieved.

Because the two lens driving modules 2 in the multiple-lens camera system 1 are close to each other, magnetic interference between two adjacent driving magnets 60 respectively in the two lens driving modules 2 is likely to occur, causing the focus speed and accuracy of the lenses to be adversely affected. As shown in FIG. 3A, to suppress magnetic interference between the two lens driving modules 2, two shielding members 61 are respectively provided in the lens driving modules 2 and between the two adjacent driving magnets 60.

Figure 3B:
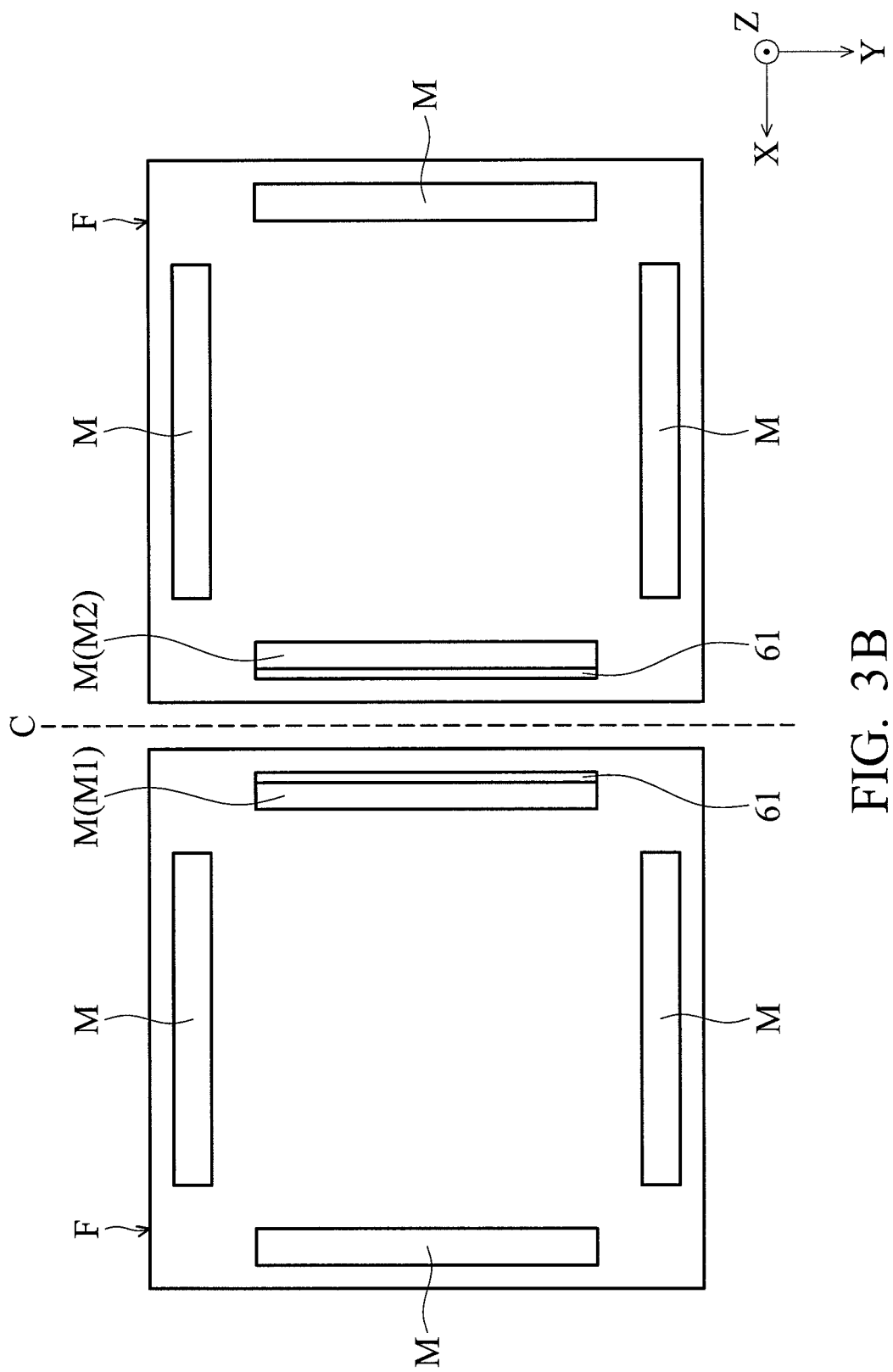
FIG. 3B is a schematic plane view showing the configuration of the magnetic elements and the shielding members in the multiple-lens camera system of FIG. 3A.

FIG. 3B shows the configuration of a plurality of magnetic elements M and shielding members 61 in the multiple-lens camera system 1. For the sake of simplicity and clarity, this embodiment and the following embodiments illustrate only the housings F, the magnetic elements M, and the shielding members 61 of the two lens driving modules to show their relative positions. As shown in FIG. 3B, the multiple-lens camera system 1 primarily comprises two lens driving modules 2 (a first lens driving module and a second lens driving module respectively on the left and right sides), and the magnetic elements M (corresponding to the driving magnets 60 in FIGS. 2 and 3A) have substantially the same structure (for example, all are long strip magnets). To distinct the two adjacent magnetic elements received in different housings F of the two lens driving modules 2 from the other magnetic elements, they are indicated as M1 and M2 and symmetrical with respect to a middle line C between the two housings F. Specifically, in order to reduce the magnetic interference between the magnetic elements M1 and M2 which are close to each other, a shielding member 61 is disposed on the right side of the magnetic element M1, and another shielding member 61 is disposed on the left side of the magnetic element M2 to overcome this problem, thereby ensuring the focus speed and accuracy of the lenses of the multiple-lens camera system.

Figure 4A:
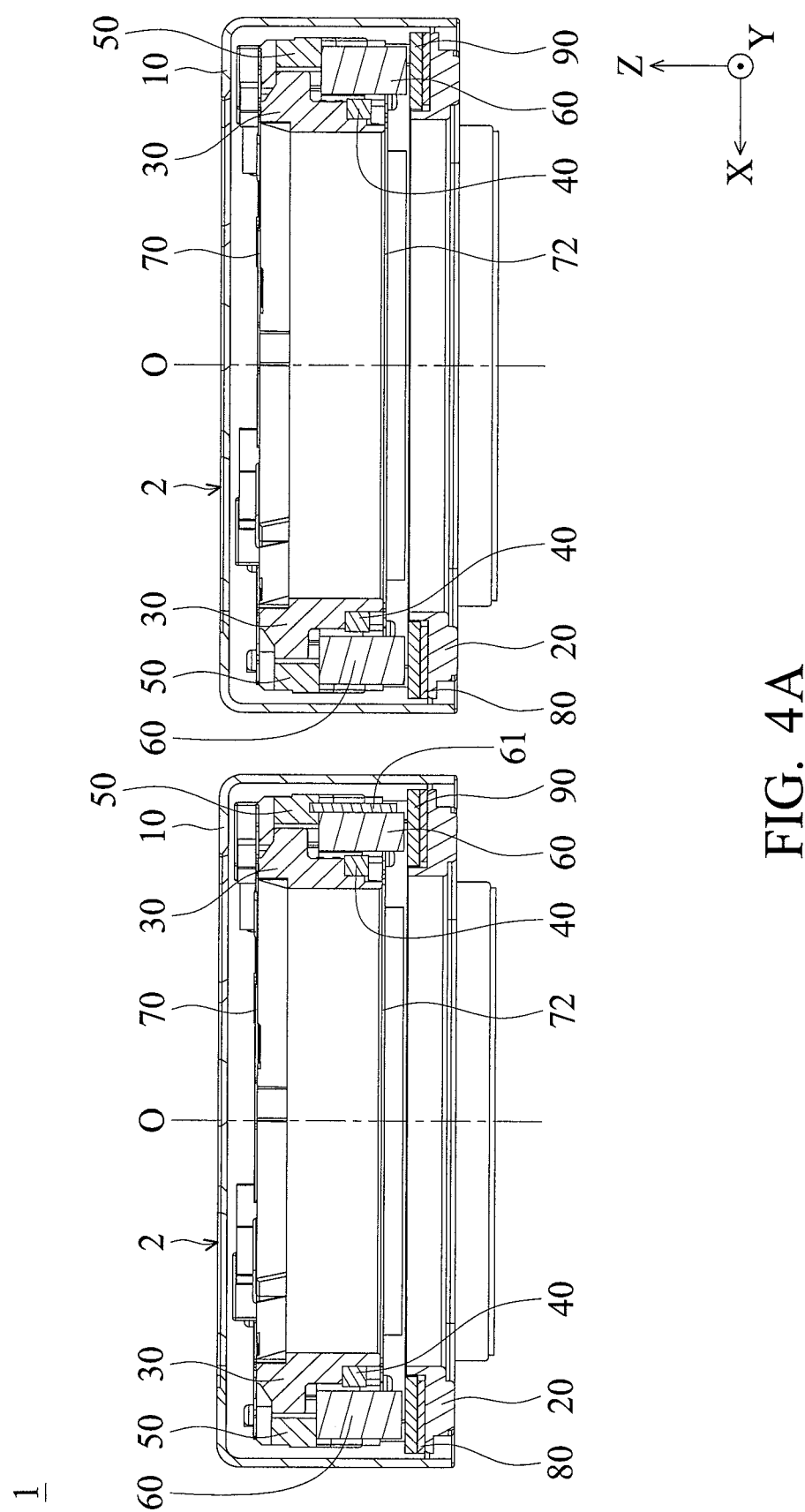
FIG. 4A is a cross-sectional view of a multiple-lens camera system in accordance with another embodiment of the invention.
Figure 4B:
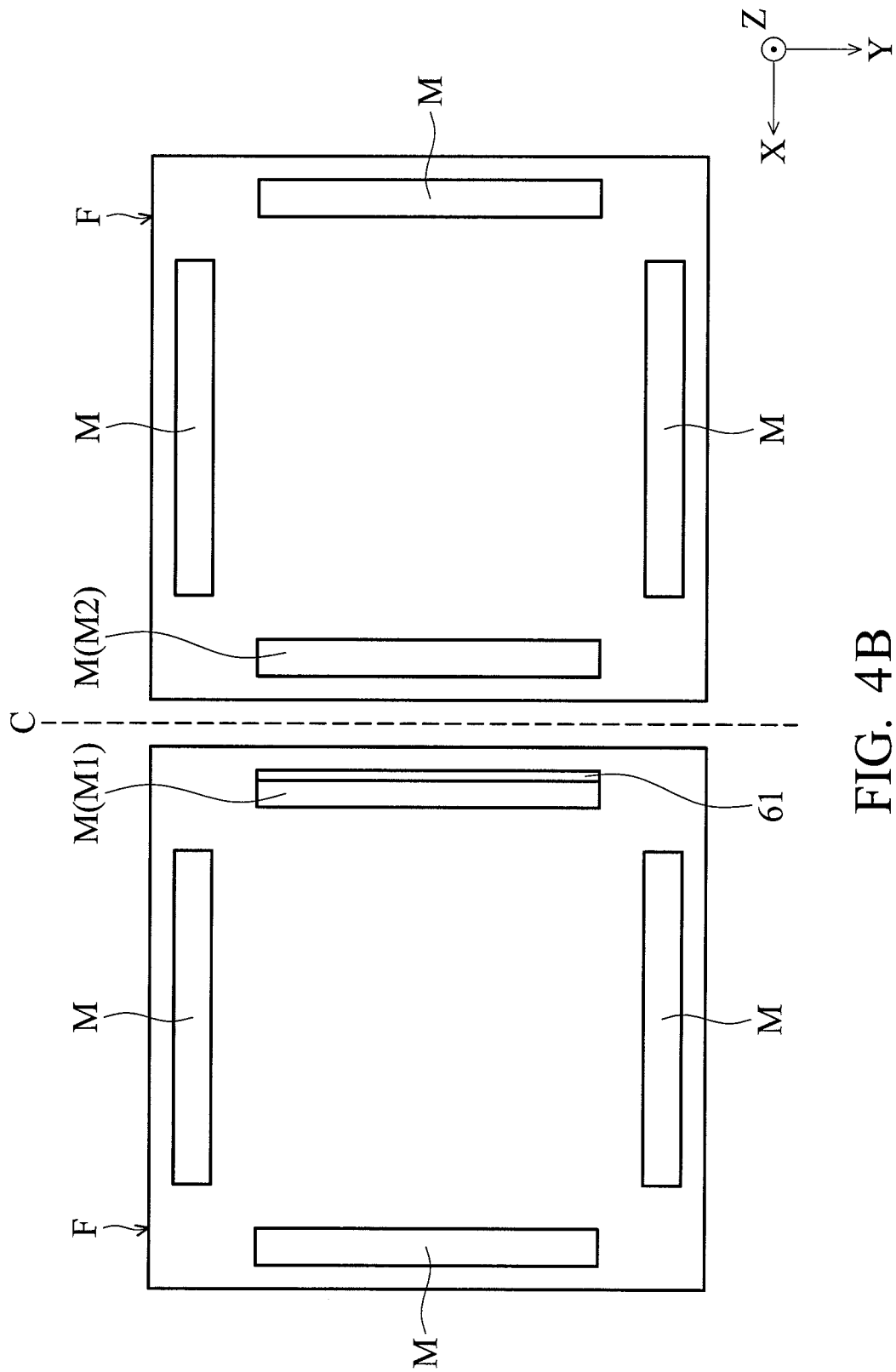
FIG. 4B is a schematic plane view showing the configuration of the magnetic elements and the shielding member in the multiple-lens camera system of FIG. 4A.

In some embodiments, the multiple-lens camera system 1 may have only one shielding member 61 disposed on the right side of the magnetic element M1 or on the left side of the magnetic element M2, to reduce the magnetic interference therebetween. As shown in FIGS. 4A and 4B, only one shielding member 61 is provided on the right side of the magnetic element M1 (corresponding to the driving magnet 60 in FIG. 4A). With the shielding member 61 disposed between the two magnetic elements M1 and M2, the magnetic interference between the two lens driving modules 2 can therefore be reduced.

Figure 5:
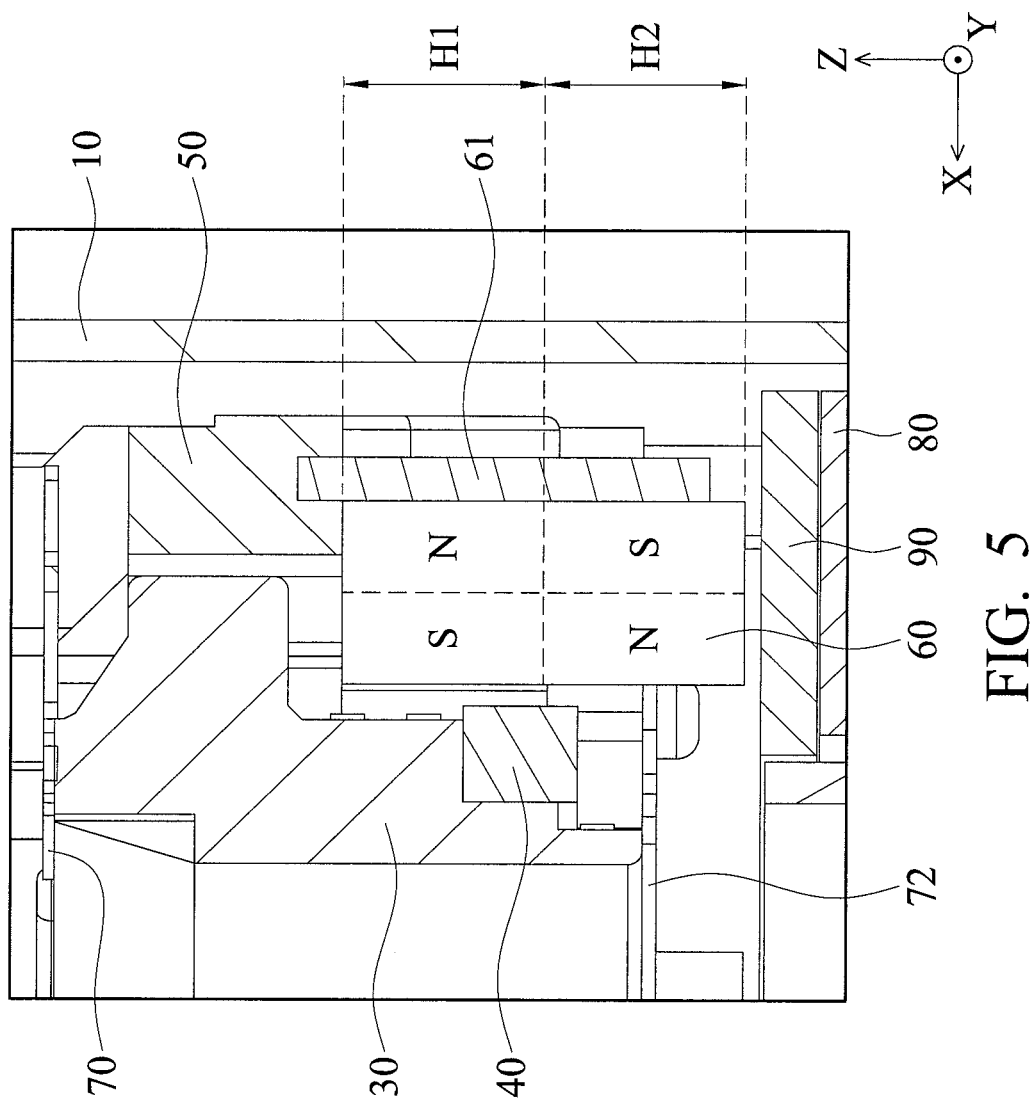
FIG. 5 is partial cross-sectional view of a lens driving module of a multiple-lens camera system in accordance with another embodiment of the invention.

In the aforementioned embodiments, the magnetic elements M (corresponding to the driving magnets 60 in FIGS. 2, 3A and 4A) may be permanent magnet or multipolar magnets. Referring to FIG. 5, the driving magnet 60 which is adjacent to another lens driving module 2 can be a quadrapolar magnet. Since multipolar magnet can produce relatively little interference with other magnetic element, it can be used with the shielding member 61 to further reduce the magnetic interference between the two lens driving modules 2, thereby ensuring the focus speed and accuracy of the lenses of the multiple-lens camera system.

Figure 6:
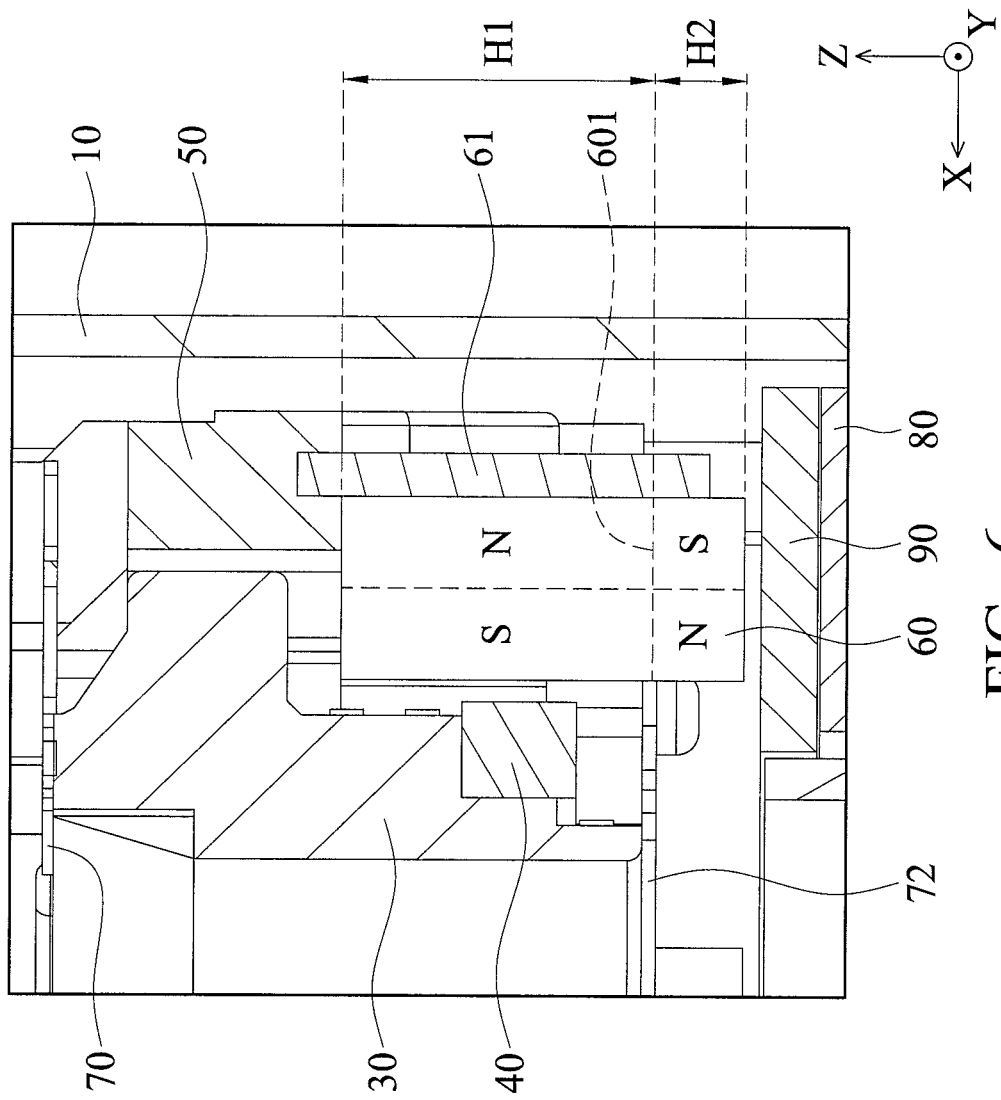
FIG. 6 is partial cross-sectional view of a lens driving module of a multiple-lens camera system in accordance with another embodiment of the invention.

As depicted in FIG. 5, the multipolar driving magnet 60 have an upper portion and a lower portion, wherein the polar directions (N-S) of the upper and lower portions are opposite to each other. In this embodiment, the upper portion has a height H1 along the Z axis, and the lower portion has a height H2 along the Z axis, wherein H1/H2 is substantially ranged between 0.9 to 1.1 (for example, H1:H2=1:1), so as to reduce the magnetic interference between the two lens driving modules 2. However, the ratio of H1/H2 may also be modified depending on design requirements. Referring to FIG. 6, to enhance the electromagnetic force produced between the coil 40 and the upper portion of the driving magnet 60 for moving the lens holder 30 and the lens therein along the Z axis, the ratio of H1/H2 may exceed 1.1.

FIG. 6 shows a boundary line 601 that divides the driving magnet 60 into the upper portion and the lower portion, and the boundary line 601 is lower than the coil 40. Thus, a stronger electromagnetic force can be generated by the upper portion of the driving magnet 60 and the coil 40 to move the lens holder 30 and the lens therein along the Z axis. In some embodiments, the boundary line 601 may be lower than the bottom surface of the lower spring sheet 72, so as to further increase the electromagnetic force for moving the lens holder 30 and the lens therein along the Z axis.

It should be noted that the shielding member 61 can be integrally formed on the frame 50 in advance, and then the driving magnet 60 can be affixed in the recess formed by the frame 50 and the driving magnet 60, wherein the driving magnet 60 may slightly protrude from the lower end of the shielding member 61. In an exemplary embodiment, the upper end of the shielding member 61 may be integrally formed in the frame 50 by insert molding, and the driving magnet 60 is subsequently affixed to the frame 50 and the shielding member 61. As the frame 50 is usually made of plastic material, and both of the driving magnet 60 and the shielding member 61 may comprise metal material such as iron, the driving magnet 60 can be firmly affixed to the shielding member 61 due to their bonding strength higher than that between the driving magnet 60 and the frame 50, thereby efficiently improving the positioning accuracy during assembly and the structural strength of the product after assembly.

Figure 7:
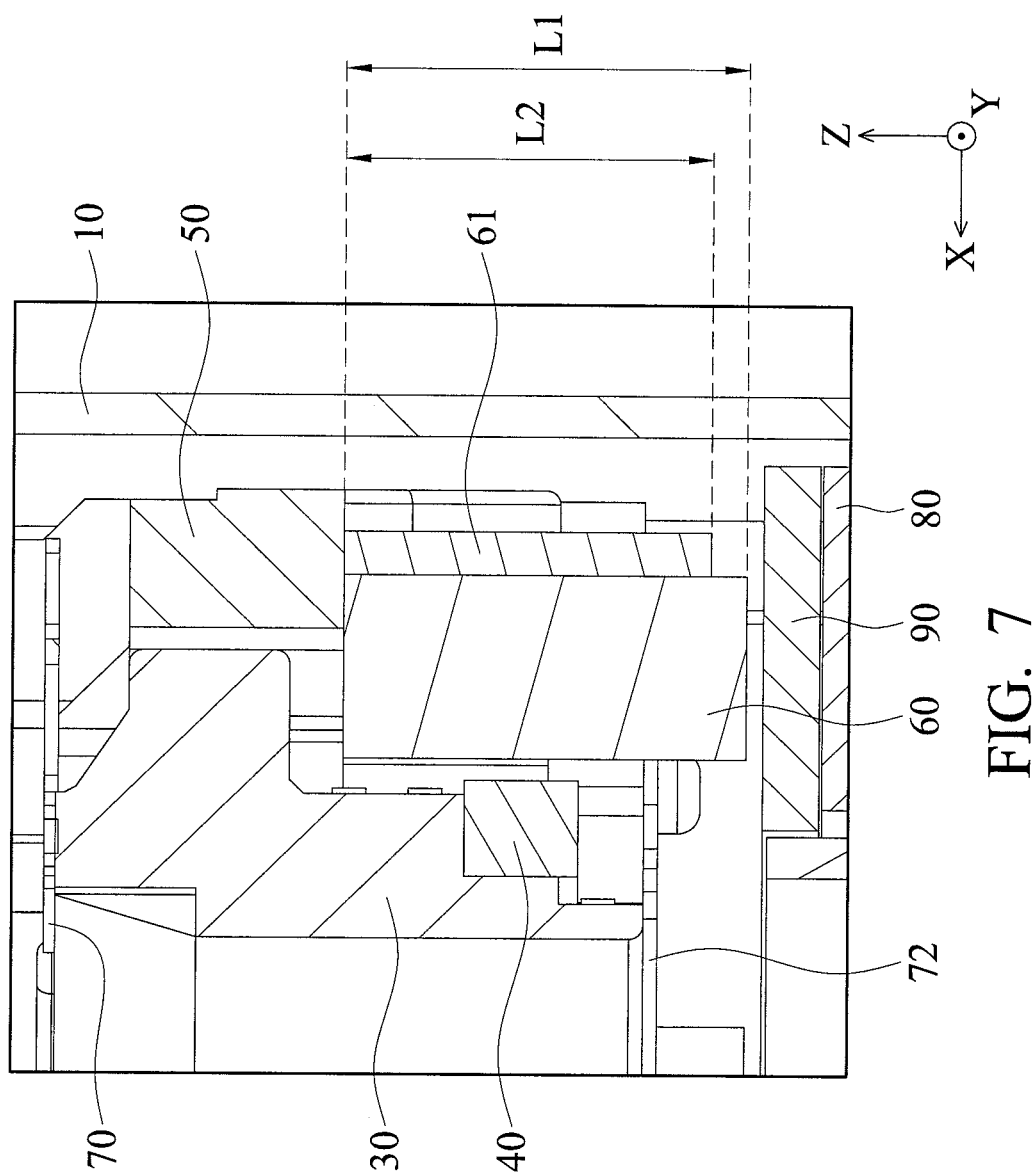
FIG. 7 is partial cross-sectional view of a lens driving module of a multiple-lens camera system in accordance with another embodiment of the invention.

Referring to FIG. 7, a shielding member 61 according to another embodiment has an upper end aligned with a top surface of the driving magnet 60, and a lower portion of the driving magnet 60 protrudes from the lower end of the shielding member 61. That is, the driving magnet 60 has a height L1 greater than a height L2 of the shielding member 61 along the Z axis. It should be noted that the driving magnet 60 and the shielding member 61 in all the embodiments can be affixed to each other by adhesive. With the shielding member 61 disposed on the outer side of the driving magnet 60, the magnetic interference between the driving magnets in different lens driving modules 2 can be efficiently reduced, thereby ensuring the focus speed and accuracy of the lenses in the multiple-lens camera system.

Figure 8:
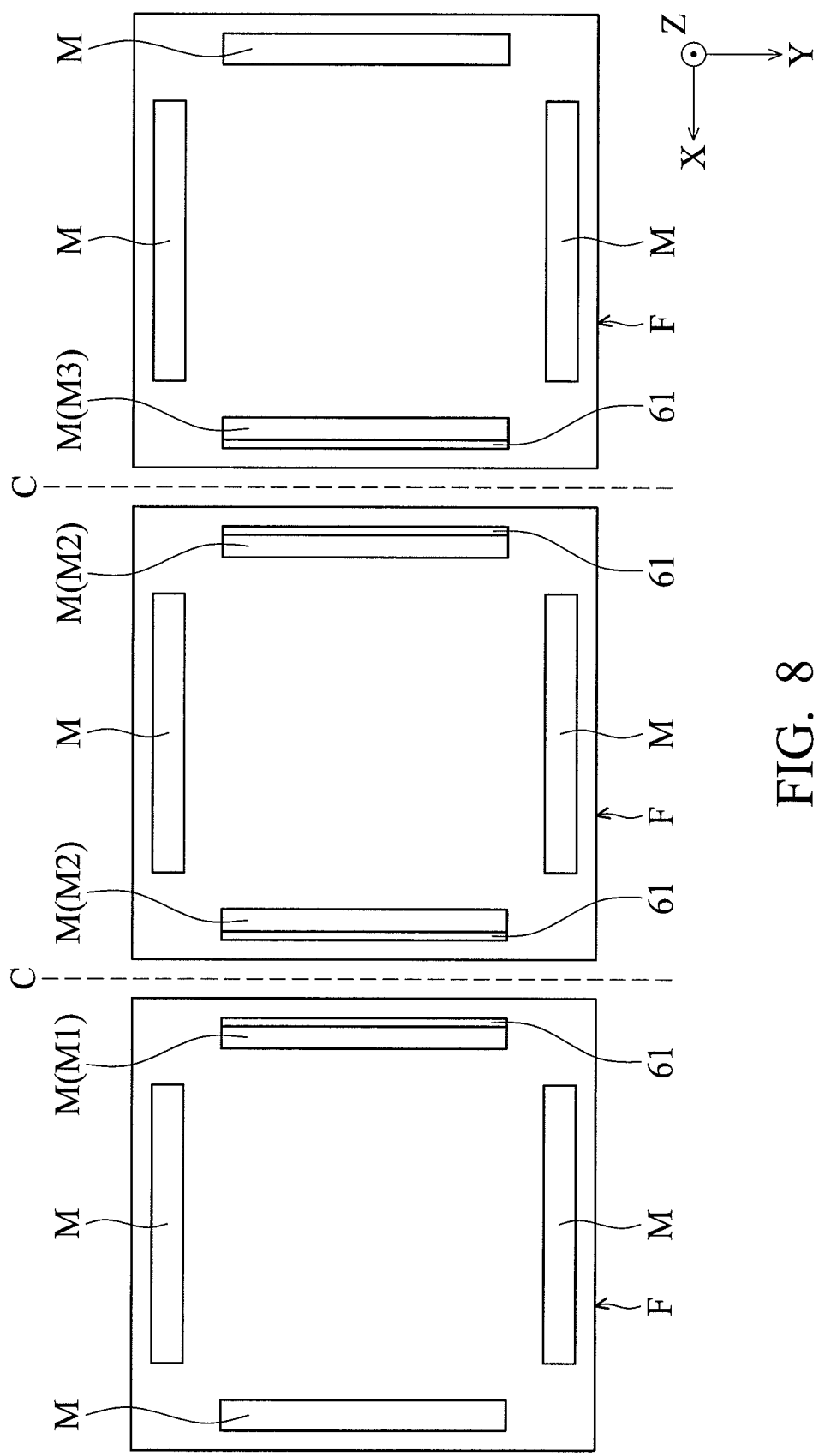
FIG. 8 is a schematic plane view showing the configuration of the magnetic elements and the shielding members in the multiple-lens camera system in accordance with another embodiment of the invention.

Referring to FIG. 8, a multiple-lens camera system according to another embodiment has three lens driving nodules (the first, second, and third lens driving modules from the left to the right). In this embodiment, each lens driving nodule may have substantially the same configuration as disclosed in FIG. 2, and the only difference among the three lens driving nodules is the arrangement of the shielding members 61. As shown in FIG. 8, the magnetic elements M (corresponding to the driving magnets 60 in FIGS. 2 and 3A) may have the same structure such as long strip magnets. For the sake of simplicity and clarity, the adjacent magnetic elements M in different housings F of the lens driving nodules are indicated as M1, M2, and M3, and they are substantially symmetrical with respect to the middle lines C between the housings F. It should be noted that all the modified embodiments shown in FIG. 3A to FIG. 7 may also be applied to the first and second lens driving modules in FIG. 8.

As the magnetic elements M1, M2, and M3 in FIG. 8 are close to each other and may cause magnetic interference therebetween, four shielding members 61 are disposed on the right side of the magnetic element M1, the left and right sides of the magnetic element M1, M2, and the left side of the magnetic element M3, respectively. In some embodiments, the multiple-lens camera system may have at least one shielding member 61 between the two magnetic elements M1 and M2, and at least one shielding member 61 between the two magnetic elements M2 and M3, so as to suppress magnetic interference between the three lens driving nodules, and ensure the focus speed and accuracy of the lenses in the multiple-lens camera system.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A multiple-lens camera system, comprising:
   a first lens driving module and a second lens driving module, respectively comprising:
   a frame;
   a lens holder, movably disposed in the frame for holding a lens;
   a magnetic element, disposed on a side of the lens holder;
   a driving board, having a first coil corresponding to the magnetic element, to generate a magnetic force for moving the lens holder and the lens relative to the driving board; and
   a shielding member, disposed in the first lens driving module and between the two magnetic elements of the first and second lens driving modules which are adjacent to each other, to suppress magnetic interference between the first and second lens driving modules, wherein the shielding member and the magnetic element are affixed to the frame, and the first coil act with the magnetic element on the frame to generate an electromagnetic force to move the frame, the shielding member and the magnetic element relative to the driving board;
   wherein the frame of the first lens driving module is driven to move relative to the frame of second lens driving module.

2. The multiple-lens camera system as claimed in claim 1, wherein the magnetic element of the first lens driving module comprises a magnet protruding from a lower end of the shielding member.

3. The multiple-lens camera system as claimed in claim 1, wherein the shielding member is affixed to the frame by insert molding.

4. The multiple-lens camera system as claimed in claim 1, wherein the magnetic element of the first lens driving module comprises a magnet, and the shielding member protrudes from an upper end of the magnet.

5. The multiple-lens camera system as claimed in claim 1, further comprising a plurality of shielding members, respectively disposed in the first and second lens driving modules and between the magnetic elements of the first and second lens driving modules.

6. The multiple-lens camera system as claimed in claim 1, wherein the magnetic element of the first lens driving module comprises a magnet, and the height of the magnet along an optical axis of the lens is greater than the height of the shielding member along the optical axis.

7. The multiple-lens camera system as claimed in claim 1, wherein the magnetic element of the first lens driving module comprises a multipolar magnet having an upper portion and a lower portion, and the polar directions of the upper and lower portions are opposite to each other, wherein the ratio of the height of the upper portion along an optical axis of the lens to the height of the lower portion along the optical axis is ranged between 0.9 to 1.1.

8. The multiple-lens camera system as claimed in claim 1, further comprising a second coil disposed on the lens holder, wherein the magnetic element of the first lens driving module comprises a multipolar magnet having an upper portion and a lower portion, and the polar directions of the upper and lower portions are opposite to each other, wherein the upper portion is positioned corresponding to the second coil to move the lens holder relative to the frame along an optical axis of the lens, and the ratio of the height of the upper portion along the optical axis to the height of the lower portion along the optical axis is greater than 1.1.

9. The multiple-lens camera system as claimed in claim 1, wherein the magnetic element of the first lens driving module comprises a quadrapolar magnet.

10. A multiple-lens camera system, comprising:
    a first lens driving module, a second lens driving module, and a third lens driving module arranged along a longitudinal direction of the multiple-lens camera system, respectively comprising:
    a frame;
    a lens holder, movably disposed in the frame for holding a lens;
    a magnetic element, disposed on a side of the lens holder;
    a driving board, having a first coil corresponding to the magnetic element, to generate a magnetic force for moving the lens holder and the lens relative to the driving board; and
    at least two shielding members, respectively disposed between the magnetic elements of the first and second lens driving modules and between the magnetic elements of the second and third lens driving modules, to suppress magnetic interference between the first, second, and third lens driving modules, wherein the shielding member and the magnetic element are affixed to the frame, and the first coil act with the magnetic element on the frame to generate an electromagnetic force to move the frame, the shielding member and the magnetic element relative to the driving board;
    wherein the frame of the first lens driving module is driven to move relative to the frame of second lens driving module and the frame of third lens driving module.

11. The multiple-lens camera system as claimed in claim 10, further comprising four shielding members disposed between the magnetic elements of the first and second lens driving modules and between the magnetic elements of the second and third lens driving modules.

12. The multiple-lens camera system as claimed in claim 10, wherein the magnetic element of the first lens driving module comprises a magnet protruding from a lower end of the shielding member.

13. The multiple-lens camera system as claimed in claim 10, wherein the shielding member is affixed to the frame by insert molding.

14. The multiple-lens camera system as claimed in claim 10, wherein the magnetic element of the first lens driving module comprises a magnet, and the shielding member protrudes from an upper end of the magnet.

15. The multiple-lens camera system as claimed in claim 10, further comprising a plurality of shielding members, respectively disposed in the first and second lens driving modules and between the magnetic elements of the first and second lens driving modules.

16. The multiple-lens camera system as claimed in claim 10, wherein the magnetic element of the first lens driving module comprises a magnet, and the height of the magnet along an optical axis of the lens is greater than the height of the shielding member along the optical axis.

17. The multiple-lens camera system as claimed in claim 10, wherein the magnetic element of the first lens driving module comprises a multipolar magnet having an upper portion and a lower portion, and the polar directions of the upper and lower portions are opposite to each other, wherein the ratio of the height of the upper portion along an optical axis of the lens to the height of the lower portion along the optical axis is ranged between 0.9 to 1.1.

18. The multiple-lens camera system as claimed in claim 10, further comprising a second coil disposed on the lens holder, wherein the magnetic element of the first lens driving module comprises a multipolar magnet having an upper portion and a lower portion, and the polar directions of the upper and lower portions are opposite to each other, wherein the upper portion is positioned corresponding to the second coil to move the lens holder relative to the frame along an optical axis of the lens, and the ratio of the height of the upper portion along the optical axis to the height of the lower portion along the optical axis is greater than 1.1.

19. The multiple-lens camera system as claimed in claim 10, wherein the magnetic element of the first lens driving module comprises a quadrapolar magnet.

* * * * *